(12) United States Patent
Bogner et al.

(10) Patent No.: US 11,300,043 B2
(45) Date of Patent: Apr. 12, 2022

(54) INTERNAL COMBUSTION ENGINE COMPRISING A TURBOCHARGER WITH VARIABILITY AT THE COMPRESSOR INLET

(71) Applicant: Vitesco Technologies GmbH, Hannover (DE)

(72) Inventors: Mathias Bogner, Straubing (DE); Christoph Schäfer, Coburg (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/226,244

(22) Filed: Apr. 9, 2021

(65) Prior Publication Data

US 2021/0222613 A1 Jul. 22, 2021

Related U.S. Application Data

(63) Continuation of application No. PCT/EP2019/073005, filed on Aug. 28, 2019.

(30) Foreign Application Priority Data

Oct. 10, 2018 (DE) .......................... 102018217287.0

(51) Int. Cl.
*F02B 37/22* (2006.01)
*F02M 26/06* (2016.01)

(52) U.S. Cl.
CPC ........... *F02B 37/225* (2013.01); *F02M 26/06* (2016.02)

(58) Field of Classification Search
CPC .............................. F02M 26/06; F02B 37/225
See application file for complete search history.

(56) References Cited

U.S. PATENT DOCUMENTS

| | | | |
|---|---|---|---|
| 8,689,553 B2 * | 4/2014 | Johnson | F02M 35/10222 60/605.2 |
| 10,465,706 B2 | 11/2019 | Lombard et al. | |
| 10,876,638 B2 | 12/2020 | Moens et al. | |
| 2016/0265424 A1 | 9/2016 | Tingaud et al. | |
| 2017/0298943 A1 | 10/2017 | Mohtar et al. | |
| 2020/0217221 A1 * | 7/2020 | Fath | F01D 25/16 |

FOREIGN PATENT DOCUMENTS

| | | | | |
|---|---|---|---|---|
| DE | 102013003418 A1 | 8/2014 | | |
| DE | 102015209704 A1 | 8/2016 | | |
| DE | 102016210011 B4 * | 3/2018 | ......... | F04D 27/0246 |
| DE | 102016215862 A1 | 3/2018 | | |

(Continued)

OTHER PUBLICATIONS

Machine generated translation of WO-2014131790-A1.*

(Continued)

*Primary Examiner* — Ngoc T Nguyen

(57) ABSTRACT

An internal combustion engine having a turbocharger with variability at the compressor inlet, and a turbocharger. An internal combustion engine having a turbocharger, and a turbocharger, are described. A device which both performs a change in the cross section of the compressor inlet and brings about an adjustment of the exhaust gas recirculation rate is arranged in the region of the compressor inlet. As a result, the turbocharger is of space-saving and low-cost construction in the compressor inlet region.

19 Claims, 8 Drawing Sheets

(56) References Cited

FOREIGN PATENT DOCUMENTS

| DE | 102017209598 A1 | | 5/2018 | | |
|---|---|---|---|---|---|
| DE | 102018212756 B3 | * | 10/2019 | ............. | F02M 26/10 |
| EP | 3051099 B1 | * | 11/2017 | ......... | F04D 29/4213 |
| WO | WO-2014131790 A1 | * | 9/2014 | ......... | F04D 29/4213 |

OTHER PUBLICATIONS

International Search Report and Written Opinion dated Aug. 28, 2019 from corresponding International Patent Application No. PCT/EP2019/073005.

* cited by examiner

Section A - A

Section A - A

INTERNAL COMBUSTION ENGINE COMPRISING A TURBOCHARGER WITH VARIABILITY AT THE COMPRESSOR INLET

CROSS-REFERENCE TO RELATED APPLICATIONS

This application claims the benefit of PCT Application PCT/EP2019/073005, filed Aug. 28, 2019, which claims priority to German Application DE 10 2018 217 287.0, filed Oct. 10, 2018. The disclosures of the above applications are incorporated herein by reference.

TECHNICAL FIELD

The disclosure relates to an internal combustion engine having a turbocharger with a turbine and a compressor and having an exhaust gas recirculation line, by way of which exhaust gas is recirculated downstream of the turbine of the turbocharger into the intake region upstream of the compressor, where a device for changing the cross section of the compressor inlet is provided in the region of the compressor inlet.

BACKGROUND

By means of appropriate measures for narrowing or widening the compressor inlet by changing the cross section, it is possible to shift the compressor characteristic map by reducing or enlarging the inlet cross section by closing or opening the structure directly upstream of the compressor. In the open state, the corresponding measures open up the entire inlet cross section again as far as possible and hence do not or only marginally influence/shift the characteristic map. Possible solutions that achieve a shift in the compressor characteristic map by reducing the cross section at the compressor inlet are described in a number of prior art publications. As an example in this context, reference may be made to the adjusting mechanism of an iris diaphragm as a measure for narrowing the cross section. It is usually synchronized by way of a slotted link mechanism which, in turn, is driven or rotated by way of a rotary actuator with an adjusting lever and a kind of coupling linkage or coupling element. In the case of an iris diaphragm of this kind, lamellae are moved by a common adjusting ring, for example. The adjusting ring has finger-like elements on its adjusting lever, in which the lever of the rotary actuator engages.

The diaphragm mechanism of the iris consists of a plurality of lamellae that can be nested by rotation. When the lamellae are rotated parallel to the axis of rotation of the compressor, the lamellae pivot radially inward and thus lead to the desired narrowing of the inlet cross section directly upstream of the compressor wheel. The lamellae are synchronized and moved by means of an adjusting ring. Rotation of the adjusting ring also triggers rotation of the lamellae. The principle of operation is very similar to an iris diaphragm in a camera.

However, the cross section narrowing measures can also be implemented, for example, by a perforated throttle valve, which in the closed state produces a fixed narrowing of the cross section upstream of the compressor, or by any other variable structure that narrows the cross section.

The practice of providing, in the region of the compressor inlet, a device for changing the cross section of the compressor inlet in order in this way to achieve a corresponding characteristic map width of the compressor is therefore known. The additional provision of low-pressure exhaust gas recirculation (EGR) for the purpose of lowering consumption or dethrottling at part load in the case of spark-ignition engines is furthermore known. In this case, exhaust gas is recirculated downstream of the turbine of the turbocharger into the intake region upstream of the compressor. As a result, the engine is operated with an increased proportion of inert gas. As a consequence, the specific power falls, and the engine can be dethrottled in comparison with operation without EGR, thereby lowering fuel consumption. In order to allow EGR rates that are as high as possible, a corresponding pressure drop toward the intake duct of the compressor is necessary. This can be achieved either by increasing the exhaust gas pressure on the turbine side or by reducing the intake pressure upstream of the compressor.

There is a known practice in this context of implementing the active adjustment of the EGR rate on the exhaust side by a dedicated EGR valve in the exhaust tract or on the intake side by a dedicated intake air throttle upstream of the turbocharger compressor. By increasing or reducing the pressure drop across the valves, it is possible to adjust the EGR rate.

SUMMARY

The disclosure provides, in the case of an internal combustion engine of the type indicated, a device which both performs the change in the cross section of the compressor inlet and brings about an adjustment of the exhaust gas recirculation rate is arranged in the region of the compressor inlet.

With the solution according to the disclosure, the turbocharger has variability at the compressor inlet in order to shift the characteristic map by changing the cross section, this additionally being used as an EGR adjusting device. Thus, it is the purpose of the variability both to adjust the inlet mass flow of the compressor and shift the compressor characteristic map and to adjust the EGR rate as a function of the operating point of the internal combustion engine. By partial throttling of the compressor at low flow rates, it is furthermore possible, not only to shift the characteristic map but also to raise compressor efficiency levels in comparison with the case where there is no partial throttling.

By way of the disclosure, the functionalities described are united in an advantageous manner in a single component. This makes it possible to implement them in a space-saving way and, at the same time, to save costs. The following advantages are obtained by the disclosure:

maximization of the EGR mass flow by configuration of the EGR introduction means as a Venturi nozzle with introduction of the EGR mass flow at the pressure minimum;

EGR introduction itself at EGR pressure<intake pressure;

EGR introduction close to the surge limit with, at the same time, improved compressor efficiency;

less installation space required;

lower costs through elimination of one adjusting member;

less expenditure on maintenance and lower risk of failure thanks to a smaller number of components;

lower expenditure on implementation because only one adjusting member is needed to perform both functionalities;

good EGR and fresh air mixing, given appropriate design.

A particularly elegant solution by the disclosure is distinguished by the fact that the device has a single adjusting member which ensures the performance of both functions of the device.

In some examples, the device has a first throttle arranged in the region of the compressor inlet and a second throttle arranged downstream at a distance therefrom, between which the recirculated exhaust gas is introduced. Here, the introduction of the recirculated exhaust gas is implemented in the form of an introduction duct or ring. In this example, the device provided is therefore embodied as a double throttle, where introduction of recirculated exhaust gas takes place between the two throttles. In this arrangement, the EGR mass flow is first of all distributed via an annular duct and then introduced radially inward between the two throttles.

A solution in which the throttles are actuated by a common adjusting ring arranged between them has proven advantageous. In this case, the two throttles are controlled synchronously by the single common adjusting ring provided. In this arrangement, the introduction of the recirculated exhaust gas is accomplished by apertures provided in the common adjusting ring.

The adjusting ring is rotated by an actuator which is provided, thereby adjusting the two throttles. The abovementioned functions (change in the cross section of the inlet region, adjustment of the EGR rate) is thereby carried out by the two throttles.

The adjusting ring and throttles can furthermore be designed or arranged in such a way that different transmission ratios are provided between the first throttle and the adjusting ring and between the second throttle and the adjusting ring. It is thus possible, by actuation of the adjusting ring for example, for the first throttle to close more quickly than the second throttle or vice versa. A transmission ratio of 1:1 is of course also possible.

As already mentioned, the common adjusting ring is rotated by an actuator, which can be designed as in the prior art, for example, in order to adjust the throttles.

As regards the design of the two throttles, these may be in the form of variable iris diaphragms. Variable iris diaphragms of this kind can be designed in the manner described at the outset, where each iris diaphragm includes a plurality of rotatably mounted lamellae which can be pivoted inward/outward by rotation of the common adjusting ring provided. In this way, the opening cross sections of the two throttles arranged in series are changed. In this arrangement, the first throttle is subjected only to the fresh air to be compressed, while the second throttle is subjected both to the fresh air allowed through by the first throttle and to the recirculated exhaust gas mass. Both opening cross sections are regulated by the common adjusting ring.

In this case, the bearing points for the rotatable mounting of the lamellae of the two throttles are expediently integrated into the compressor housing/inlet housing.

Depending on the configuration, the compressor hub can extend as far as the first throttle or only as far as the second throttle.

In some implementations, the first throttle is designed as a variable cone, and the second throttle is designed as a variable iris diaphragm.

If the throttles are designed as variable iris diaphragms, these can be mounted in a cartridge inserted into the compressor housing.

The webs arranged between the apertures of the adjusting ring can have a streamlined configuration in order to influence the swirl of the EGR mass flow. By means of the webs, the EGR mass flow can be additionally directed or controlled, i.e. its distribution over the circumference can be controlled by webs of different widths. Swirl may even be generated upstream of the compressor by webs in the form of guide vanes.

In the case where at least one throttle is designed as an iris diaphragm, each lamella of an iris diaphragm has a first pin for the rotatable mounting thereof and a second pin, which is guided in a groove of the adjusting ring. In order in this case to influence the transmission ratio between the iris diaphragm and the adjusting ring with a constant rotation angle of the adjusting ring, the distance between the first pin and the second pin (pivot pin and sliding pin) and the radial position of the second pin are varied. In the case of a fixed rotation angle of the adjusting ring, a greater rotation of the lamellae and hence more rapid closing of the iris diaphragm formed by the lamellae is achieved if the distance between the first pin and the second pin is reduced. The second pin (sliding pin) is prevented from slipping out of the corresponding groove of the adjusting ring if the second pin is simultaneously positioned further out radially on the lamella. If the diaphragm is supposed to close more slowly with a specified fixed rotation angle of the adjusting ring, the distance between the first pin and the second pin must be increased. At the same time, the second pin can (but need not) be positioned further in. Finally, it is also possible to vary the shape or type of throttle.

In some examples, the device has two throttles, which are adjustable by two adjusting rings that can be rotated independently of one another. In this example, the first adjusting ring has only holes for the pivot pins (first pins) of the first iris diaphragm, and the second adjusting ring has grooves on both sides for the sliding pins (second pins) of the first and the second iris diaphragm. The second iris diaphragm is in turn mounted rotatably (pivot pins) in the holes in the compressor housing. If both adjusting rings are now rotated simultaneously, the first iris diaphragm remains unchanged, whereas the second iris diaphragm closes. If only the second adjusting ring is moved, both iris diaphragms close/open simultaneously. Any desired opening combinations of the first iris diaphragm and second iris diaphragm are possible by superimposing the rotations of the first and the second adjusting ring.

As a development, the two independently rotatable adjusting rings are separated from one another by a partition housing. Here, the first adjusting ring contains the grooves for the sliding pins of the first iris diaphragm. The second adjusting ring contains the grooves for the sliding pins of the second iris diaphragm. The second iris diaphragm is mounted rotatably (pivot pins) in the holes in the compressor housing. The first iris diaphragm is mounted rotatably (pivot pins) in the holes in the partition housing. The two adjusting rings open and close the iris diaphragms completely independently of one another.

In this arrangement, EGR inlet slots can be integrated into the partition housing. The second adjusting ring no longer has any EGR slots.

To control and optimize the inlet throttles and distribute the EGR mass flow, and to increase compressor efficiency levels when the throttles are closed, it may be advantageous to extend the hub region of the compressor wheel beyond the second throttle located close to the compressor, as far as a location upstream of the first throttle. In both examples, an annular EGR introduction means with a variable ring cross section (e.g. as a spiral or, in an axial normal section, as a double-kidney-shaped geometry) and/or a nozzle-shaped inlet slot is once again additionally possible. This example provides uniform introduction across the cross section.

Here, the hub body is formed by all the individual parts situated in the inlet region of the compressor stage and forming the hub contour. These are the shaft tip, the inlet spinner, the shaft nut and the compressor wheel hub, for example. In the case of an extended hub body, the length of the hub is greater than the distance between the first throttle and the second throttle.

The disclosure furthermore relates to a turbocharger for an internal combustion engine of this kind.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
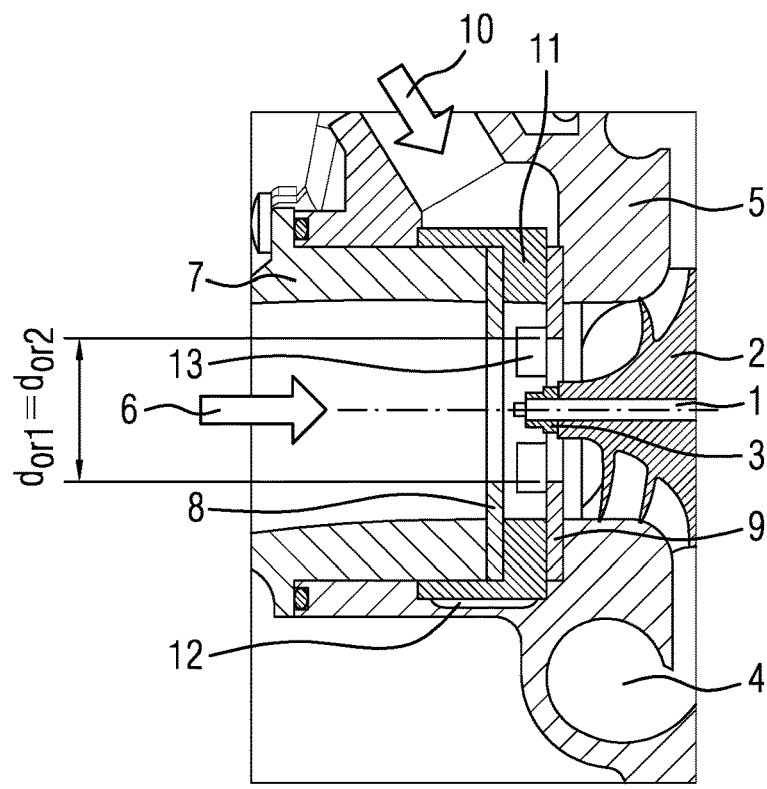
FIG. 1 shows a sectional view of the compressor inlet region of a turbocharger of a first example.

FIG. 1 shows part of a compressor of a turbocharger having a compressor inlet 6, a shaft 1 with a shaft nut 3, a compressor wheel 2 and a compressor spiral 4. Furthermore, a housing 7 of the compressor inlet and a compressor housing 5 are illustrated. Fresh air is fed in via the compressor inlet 6 and compressed by the compressor wheel 2. Recirculated exhaust gas is introduced into the compressor inlet region via an EGR feed 10. This is accomplished via an annular EGR duct 12.

Provided in the inlet region of the compressor is a double throttle, by way of which it is possible both to supply fresh air via the compressor inlet 6 and to regulate the rate of exhaust gas recirculation. This double throttle has a first iris throttle 8 and a second iris throttle 9, arranged downstream thereof, which are designed in the manner of an iris diaphragm and have lamellae, by way of the pivoting of which the opening cross section of the compressor inlet can be reduced or increased.

Here, FIG. 1 shows a directly mounted double diaphragm (with extended lamellae) and with segmented introduction of recirculated exhaust gas between the two iris throttles 8 and 9. Between these throttles 8, 9 there is a rotatable adjusting ring 11, by way of which the throttles can be opened and closed. Here, introduction of EGR is accomplished by the common adjusting ring 11, which has corresponding apertures 13 or EGR introduction slots for this purpose. In this arrangement, the EGR mass flow is first of all distributed via an annular duct 12 and then introduced radially inward through the adjusting ring 11 of the diaphragms.

Here, the bearing points for the lamellae of the iris throttles 8, 9 are integrated into the adjacent housings, namely the inlet housing and the compressor housing 5.

Figure 2:
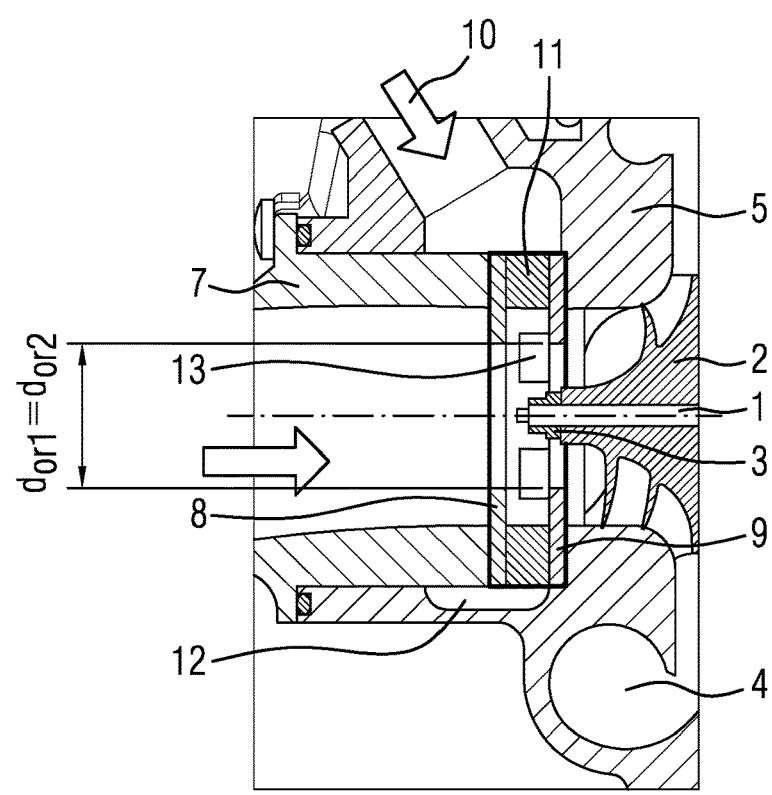
FIG. 2 shows a view similar to FIG. 1 of a second example.

The example shown in FIG. 2 shows a double EGR throttle which likewise includes a first iris throttle 8 and a second iris throttle 9. The double throttle has a slotted adjusting ring 11 for the iris throttles 8, 9, the ring being held by a cartridge. The iris diaphragms 8, 9 are mounted directly in the cartridge. The cartridge is inserted as a preassembled unit into the compressor housing 5 and is held in position and secured against twisting by the adjoining housings.

Figure 3:
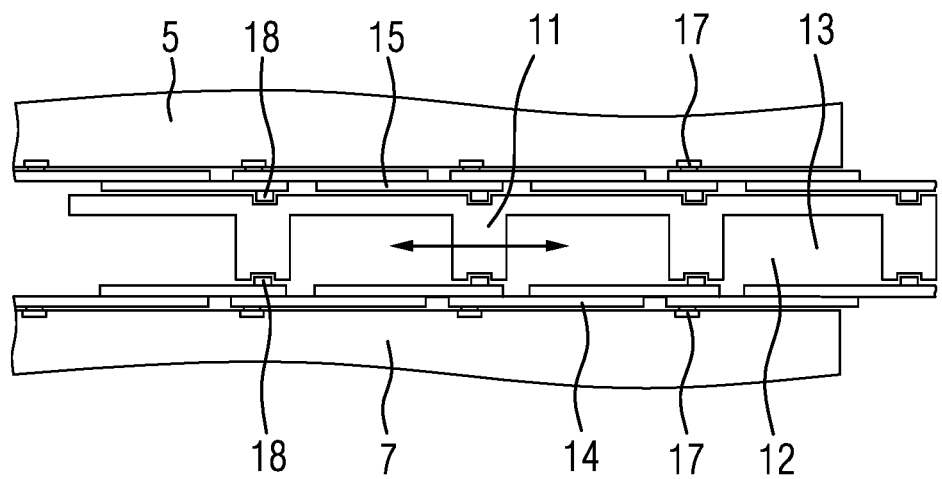
FIG. 3 shows a schematic development of a directly mounted double throttle with an adjusting ring.

FIG. 3 shows a schematic development of the directly mounted double throttle with the adjusting ring 11, which is shown in FIG. 1. The adjusting ring 11 is rotated to adjust the two iris throttles 8, 9. In this process, the lamellae 15 of the second iris throttle 9 and lamellae 14 of the first iris throttle 8, the lamellae being rotatably mounted via pivot pins 17 on the compressor housing 5 and on the housing 7 of the inlet geometry, which are both fixed, are pivoted inward or outward, more specifically by sliding pins 18, which are arranged on the lamellae and engage in corresponding grooves of the adjusting ring 11.

As can be seen from FIG. 3, the adjusting ring 11 has, between individual webs, corresponding apertures 13, via which the recirculated exhaust gas mass introduced via the annular duct 12 passes through the adjusting ring 11 between the iris throttles 8, 9 into the compressor inlet 6.

Figure 4:
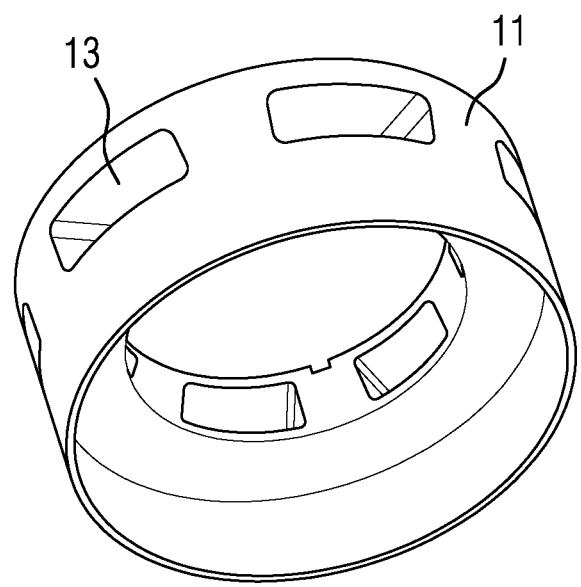
FIG. 4 shows a three-dimensional view of an adjusting ring.

FIG. 4 shows a three-dimensional view of the adjusting ring 11 with the apertures 13 through which the recirculated exhaust gas mass enters the compressor inlet 6.

Figure 5:
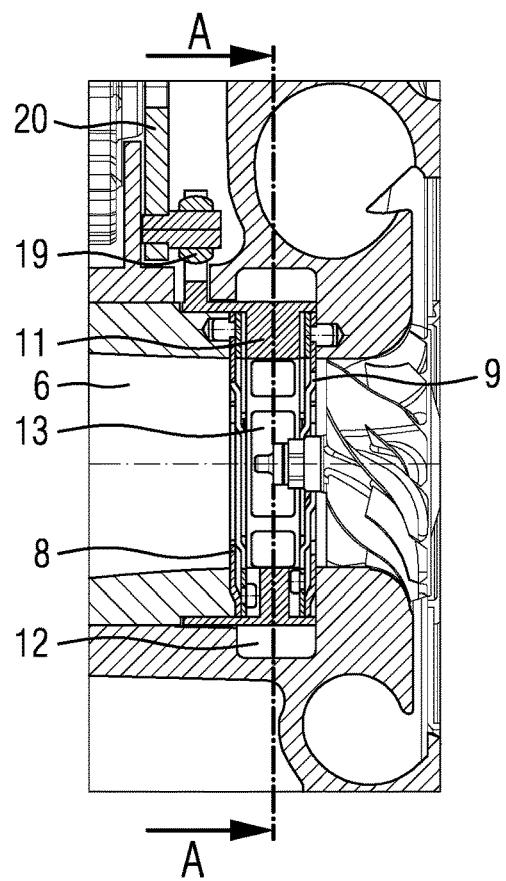
FIG. 5 shows a sectional view of the compressor inlet region of a turbocharger according to another example.
Figure 6:
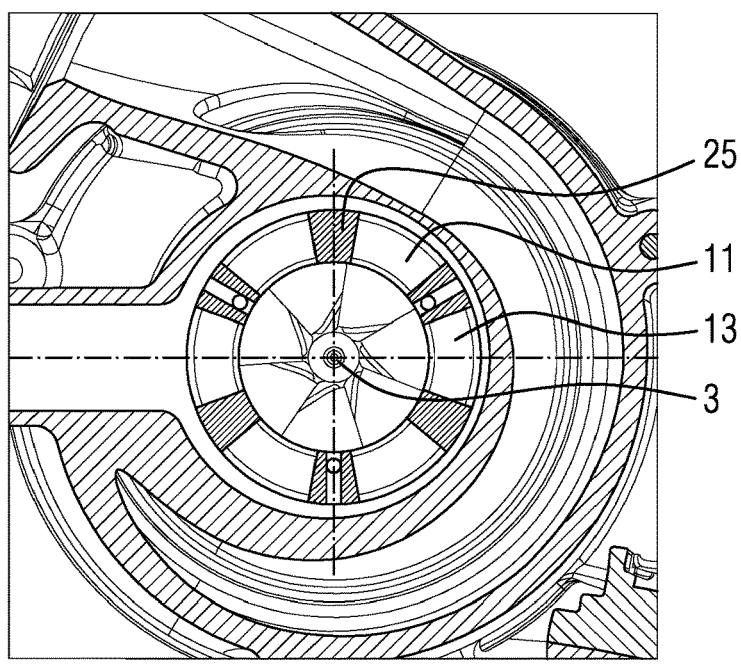
FIG. 6 shows a sectional view along the line A-A in FIG. 5.

FIGS. 5 and 6 show a further example of a directly mounted double throttle with a common adjusting ring 11. FIG. 5 illustrates the control of the adjusting ring 11 via a coupling linkage 19 and a corresponding actuator 20. Here too, the recirculated exhaust gas mass enters the space between the two iris throttles 8, 9, in which the adjusting ring 11 is situated, via the EGR feed and the annular duct 12. The exhaust gas mass passes through the apertures 13 in the adjusting ring 11 into the inlet region of the compressor and is there fed to the compressor wheel together with the fresh air introduced.

The sectional view of FIG. 6 shows the adjusting ring 11 with the apertures 13, which are distributed over the circumference and between which corresponding webs 25 are situated. By way of these webs 25, the EGR mass flow can be additionally directed or controlled, i.e. the distribution thereof over the circumference can be controlled by webs 25 of different widths, or it is even possible to generate swirl upstream of the compressor by webs in the form of guide vanes.

Figure 7:
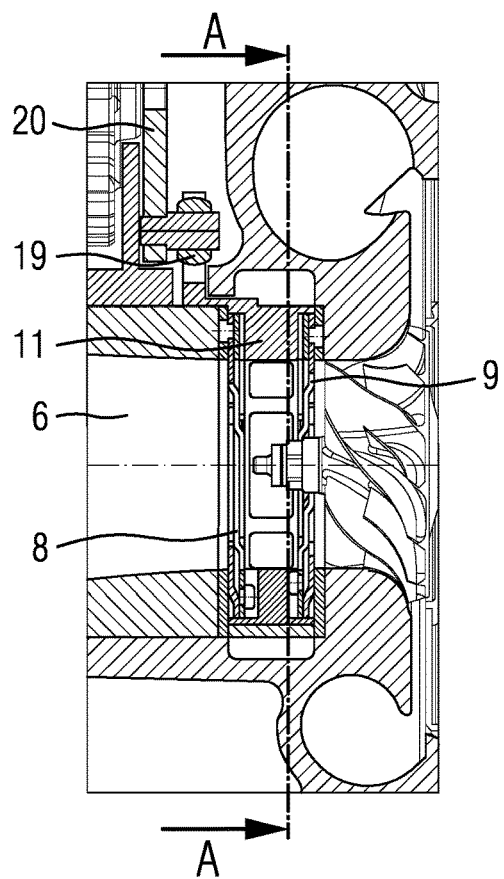
FIG. 7 shows a sectional view similar to FIG. 5 for a further example.
Figure 8:
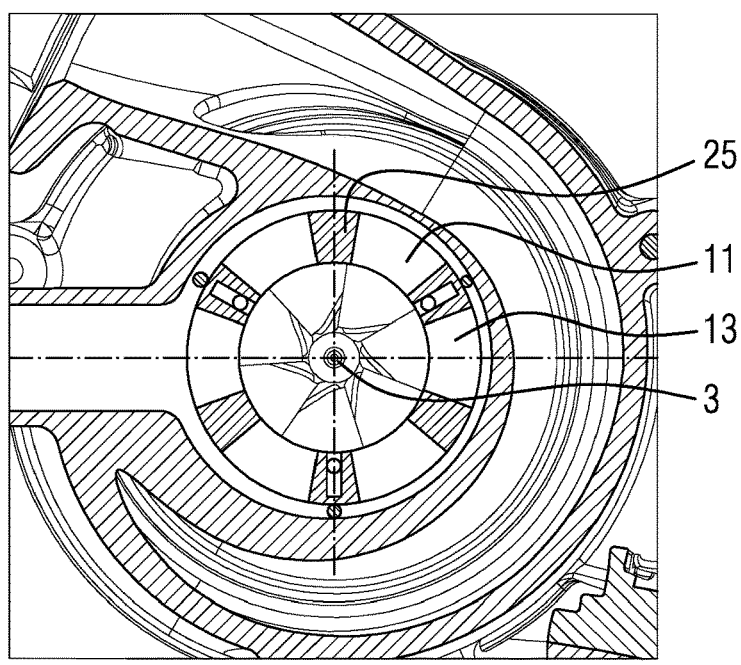
FIG. 8 shows a sectional view along the line A-A in FIG. 7.

FIGS. 7 and 8 show a cartridge solution for the double throttle with an adjusting ring 11. Here too, corresponding control of the adjusting ring via a coupling linkage 19 and an actuator 20 is illustrated. The plan view (section A-A) shows the lamella grooves, the adjusting ring 11 with EGR apertures (slots) 13 and the spacers of the cartridge side parts, which simultaneously serve to guide the adjusting ring 11.

Figure 10:
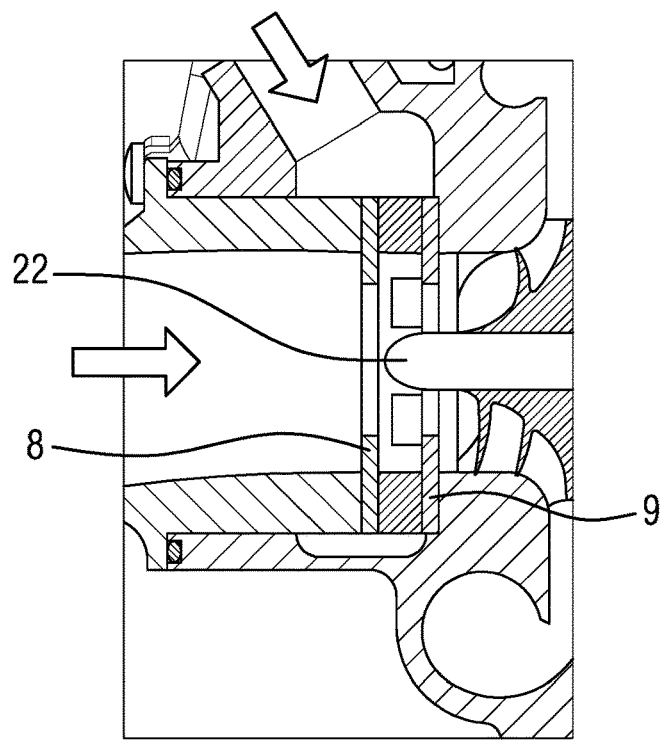
FIG. 10 shows a sectional view similar to FIG. 9 of another example.

The implementations and examples described and illustrated above make it possible to position the double throttle located close to the compressor directly upstream of the compressor wheel 2. In all cases, the compressor hub 22 extends only to a point upstream of the second iris throttle 9 located close to the compressor, as shown in FIG. 10. Here, the short hub is provided with the reference sign 22.

Figure 9:
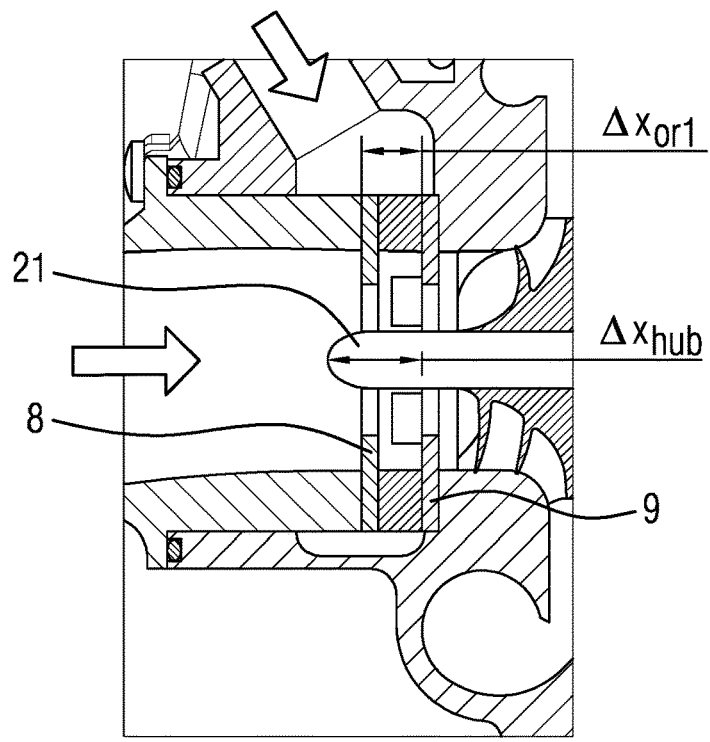
FIG. 9 shows a sectional view of the compressor inlet region of a turbocharger according to another example.

To control and optimize the inlet throttles and distribute the EGR mass flow, and to increase compressor efficiency levels when the throttles are closed, it may be advantageous to extend the hub region of the compressor wheel 2 beyond the second iris throttle 9 located close to the compressor, as far as a location upstream of the first throttle 8, as illustrated in FIG. 9. There, the correspondingly lengthened hub is provided with the reference sign 21.

Figure 11:
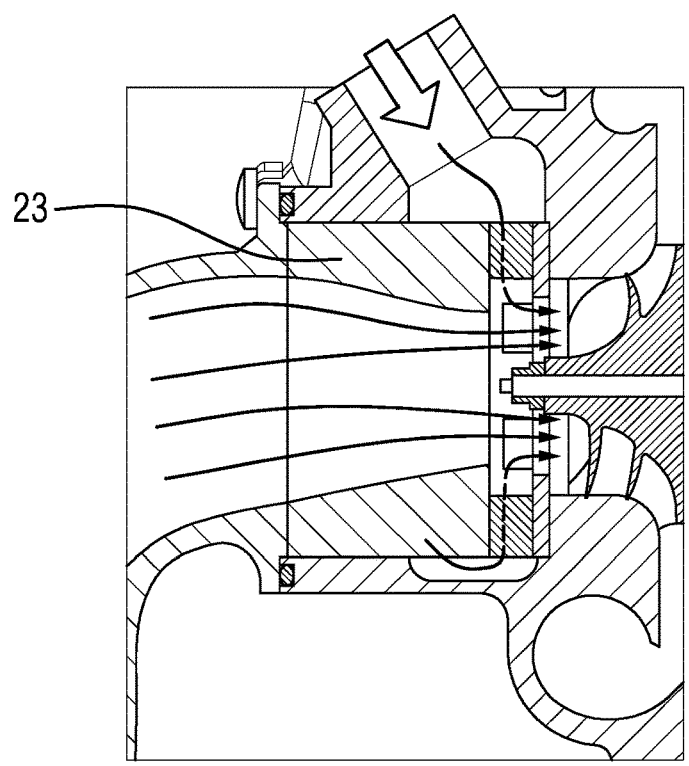
FIG. 11 shows a sectional view similar to FIG. 9 of another example.
Figure 12:
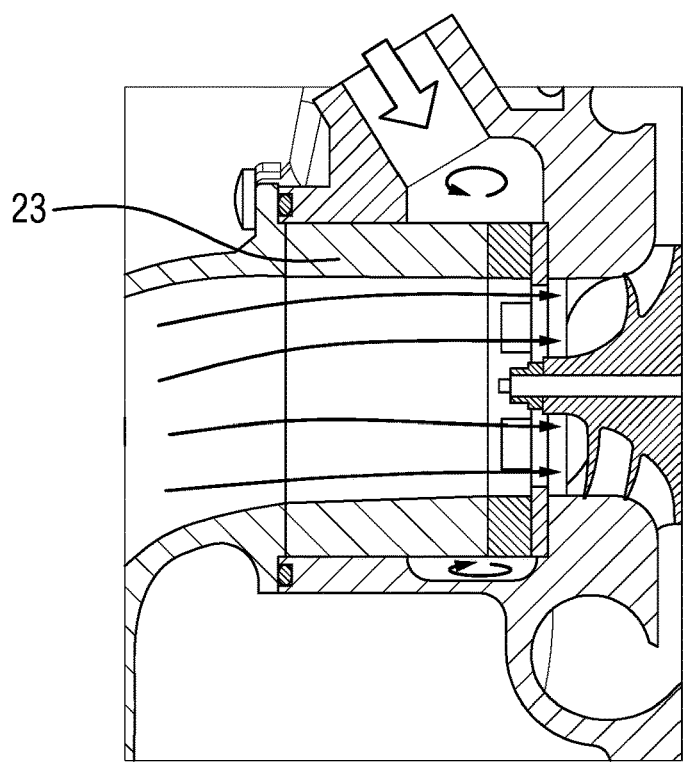
FIG. 12 shows a sectional view similar to FIG. 11 of another example.

Apart from the normal implementation as a double throttle with a first iris throttle 8 and a second iris throttle 9, which are arranged in series in the inlet region of the compressor, it is possible to combine a variable inlet cone, which then acts as the first throttle, and a variable diaphragm, which then acts as the second throttle. FIG. 11 illustrates an example of this kind, in which an inlet cone 23 is combined with a second iris throttle 9 of the type described above. A corresponding example with a modified inlet cone 23 and an iris throttle 9 is illustrated in FIG. 12.

Figure 13:
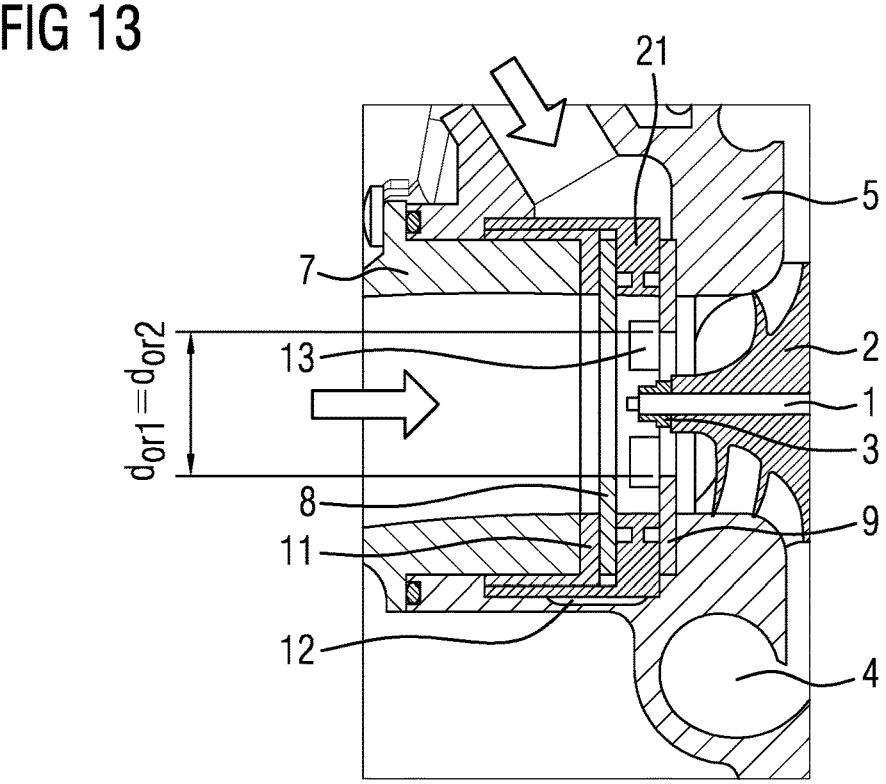
FIG. 13 shows a sectional view similar to FIG. 11 of another example.

Yet another example is shown in FIG. 13. In this example, the two throttles 8, 9 can be adjusted by two adjusting rings 11 and 21 that can be rotated independently of one another. In this case, the rotatable adjusting ring 11 shown on the left in the figure has only holes for the sliding pins of the first iris throttle 8, and the second adjusting ring 21 has grooves on both sides for the sliding pins of the first iris throttle 8 and the second iris throttle 9. The second iris throttle 9 is in turn mounted rotatably (pivot pins) in the holes in the compressor housing. If both adjusting rings 11 and 21 are now rotated simultaneously, the first iris throttle 8 remains unchanged, whereas the second iris throttle 9 closes. If only the second adjusting ring 21 is moved, both iris diaphragms 8, 9 move simultaneously. Any desired opening combinations of the first iris throttle 8 and second iris throttle 9 are possible by superimposing the rotations of the first adjusting ring 11 and the second adjusting ring 21.

Figure 14:
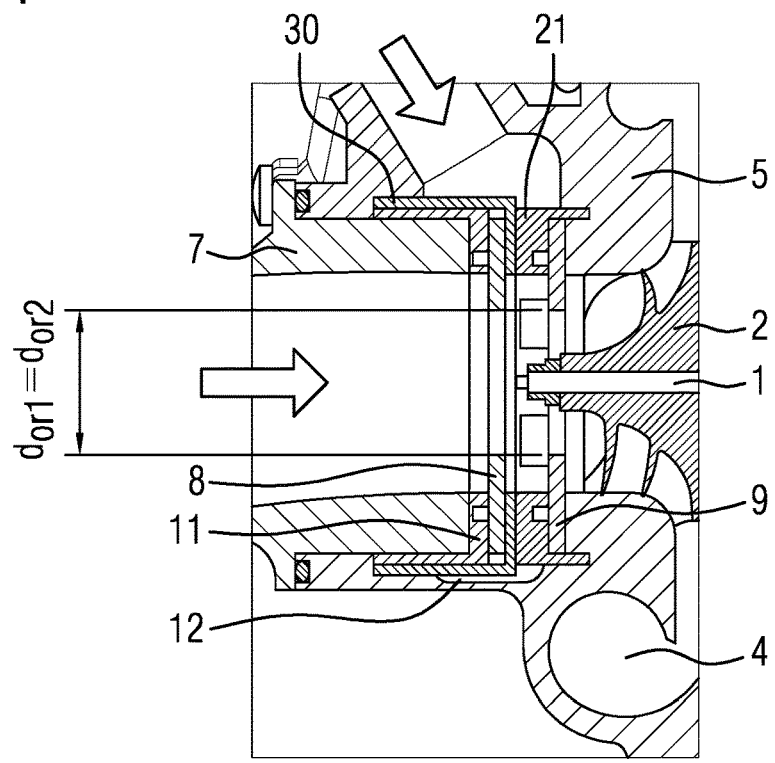
FIG. 14 shows a sectional view similar to FIG. 11 of another example.
Figure 15:
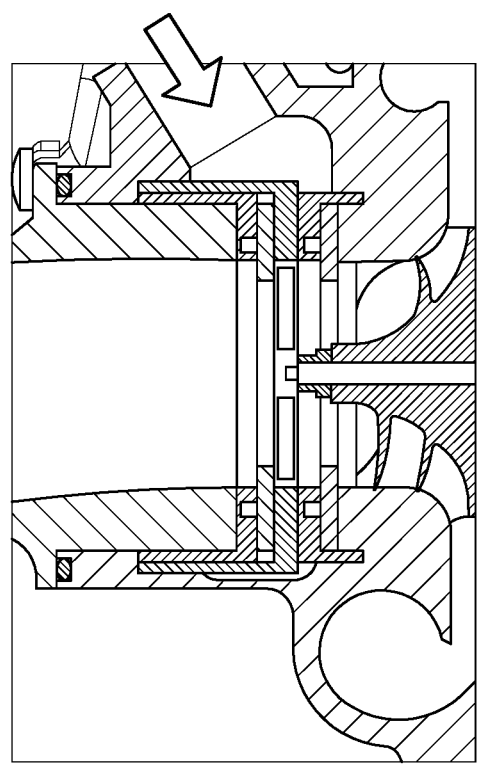
FIG. 15 shows a sectional view similar to FIG. 11 of yet another example.

Yet another example of a double throttle is illustrated in FIG. 14. Here, the special feature consists in that the two iris throttles 8, 9 can be adjusted by two independently rotatable adjusting rings 11, 21, which are separated from one another by a partition housing 30. In this example, the first adjusting ring 11 contains the grooves for the sliding pins of the first iris diaphragm 8. The second adjusting ring 21 is provided with the grooves for the sliding pins of the second iris diaphragm 9. The second iris throttle 9 is mounted rotatably (by pivot pins) in the holes in the compressor housing. The first iris throttle 8 is mounted rotatably (pivot pins) in the holes in the partition housing 30. The two adjusting rings open and close the iris throttles completely independently of one another. FIG. 14 shows a variant in which the EGR inlet slots are integrated into the partition housing 30. The example in FIG. 15 no longer has any EGR slots.

A number of implementations have been described. Nevertheless, it will be understood that various modifications may be made without departing from the spirit and scope of the disclosure. Accordingly, other implementations are within the scope of the following claims.

What is claimed is:

1. An internal combustion engine having a turbocharger with a turbine and a compressor and having an exhaust gas recirculation line, by way of which exhaust gas is recirculated downstream of the turbine of the turbocharger into an intake region upstream of the compressor, wherein a device for changing a cross section of a compressor inlet is provided in the region of the compressor inlet, wherein the device which both performs the change in the cross section of the compressor inlet and brings about an adjustment of an exhaust gas recirculation rate is arranged in the region of the compressor inlet,
wherein the device has a first throttle arranged in the region of the compressor inlet and a second throttle arranged downstream at a distance therefrom, between which the recirculated exhaust gas is introduced.

2. The internal combustion engine as claimed in claim 1, wherein the device has a single adjusting member which ensures performance of both functions of the device.

3. The internal combustion engine as claimed in claim 1, wherein the introduction of the recirculated exhaust gas is implemented in by way of an introduction duct or ring.

4. The internal combustion engine as claimed in claim 1, wherein the throttles are actuated by means of a common adjusting ring arranged between them.

5. The internal combustion engine as claimed in claim 4, wherein introduction of the recirculated exhaust gas is accomplished by apertures in the common adjusting ring.

6. The internal combustion engine as claimed in claim 5 wherein webs arranged between the apertures of the adjusting ring have a streamlined configuration.

7. The internal combustion engine as claimed in claim 4, wherein different transmission ratios are provided between the first throttle and the adjusting ring and between the second throttle and the adjusting ring.

8. The internal combustion engine as claimed in claim 4, wherein the common adjusting ring is rotated by means of an actuator in order to adjust the throttles.

9. The internal combustion engine as claimed in claim 1, wherein the throttles include variable iris diaphragms.

10. The internal combustion engine as claimed in claim 9, wherein each iris diaphragm comprises a plurality of rotatably mounted lamellae which can be pivoted inward/outward by rotation of the adjusting ring.

11. The internal combustion engine as claimed in claim 10, wherein bearing points for the rotatable mounting of the lamellae are integrated into the compressor housing/inlet housing.

12. The internal combustion engine as claimed in claim 10, wherein each lamella of an iris diaphragm has a first pin for the rotatable mounting thereof and a second pin, which is guided in a groove of the adjusting ring.

13. The internal combustion engine as claimed claim 9, wherein the variable iris diaphragms are mounted in a cartridge inserted into the compressor housing.

14. The internal combustion engine as claimed in claim 1, wherein a compressor hub extends as far as the first throttle or beyond the latter.

15. The internal combustion engine as claimed in claim 1, wherein the first throttle is designed as a variable cone, and the second throttle is designed as a variable iris diaphragm.

16. The internal combustion engine as claimed in claim 1, wherein introduction of the exhaust gas recirculation is designed as a Venturi nozzle.

17. The internal combustion engine as claimed in claim 1, wherein the device has two throttles, which are adjustable by means of two adjusting rings that can be rotated independently of one another.

18. The internal combustion engine as claimed in claim 17, wherein the two independently rotatable adjusting rings are separated from one another by a partition housing.

19. A turbocharger for an internal combustion engine, the turbocharger including:
   a turbine;
   a compressor;
   an exhaust gas recirculation line by way of which exhaust gas is recirculated downstream of the turbine of the turbocharger into an intake region upstream of the compressor; and
   a device for changing a cross section of a compressor inlet is positioned in the region of the compressor inlet, the device performs the change in the cross section of the compressor inlet and brings about an adjustment of an exhaust gas recirculation rate,
   wherein the device has a first throttle arranged in the region of the compressor inlet and a second throttle arranged downstream at a distance therefrom, between which the recirculated exhaust gas is introduced.

* * * * *